Dec. 14, 1954   W. H. AMSTER   2,696,796
HYDROFOIL CRAFT HAVING ELECTRICAL CONTROL MEANS
Filed July 2, 1951   5 Sheets-Sheet 1

INVENTOR
WARREN H. AMSTER

BY
ATTORNEYS

Dec. 14, 1954  W. H. AMSTER  2,696,796
HYDROFOIL CRAFT HAVING ELECTRICAL CONTROL MEANS
Filed July 2, 1951  5 Sheets-Sheet 3
FIG. 5.
FIG. 8.
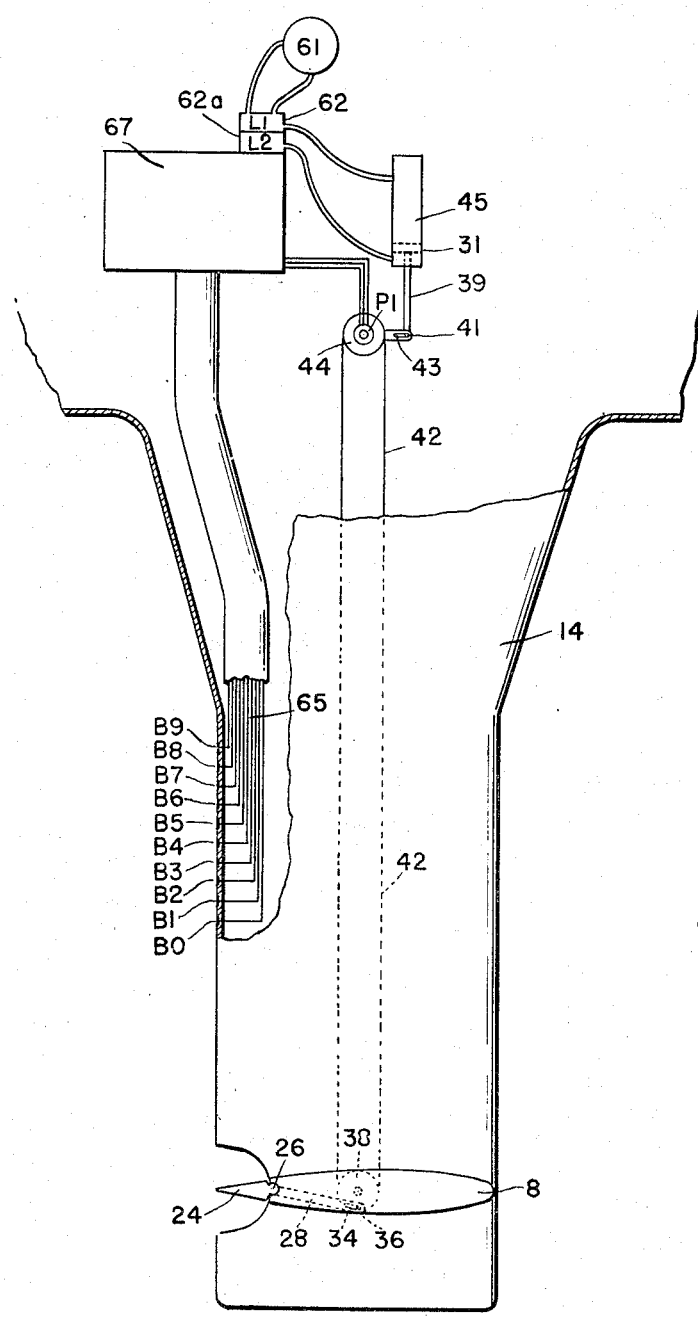
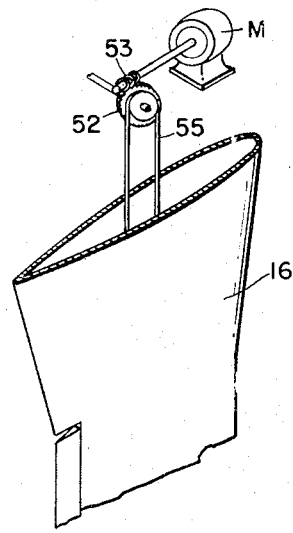
INVENTOR
WARREN H. AMSTER
ATTORNEYS Dec. 14, 1954    W. H. AMSTER    2,696,796
HYDROFOIL CRAFT HAVING ELECTRICAL CONTROL MEANS
Filed July 2, 1951    5 Sheets-Sheet 4

INVENTOR
WARREN H. AMSTER

BY
ATTORNEYS

Dec. 14, 1954 W. H. AMSTER 2,696,796
HYDROFOIL CRAFT HAVING ELECTRICAL CONTROL MEANS
Filed July 2, 1951 5 Sheets-Sheet 5

INVENTOR
WARREN H. AMSTER

ATTORNEYS

United States Patent Office 2,696,796
Patented Dec. 14, 1954

2,696,796

HYDROFOIL CRAFT HAVING ELECTRICAL CONTROL MEANS

Warren H. Amster, New York, N. Y., assignor to The Hydrofoil Corporation, Washington, D. C., a corporation of Delaware Application July 2, 1951, Serial No. 234,878

9 Claims. (Cl. 114—665)

This invention relates to marine craft of the type having submerged water foils which dynamically support a hull out of the water at cruising speed. The most difficult aspect of operating successfully a craft of this type is constantly maintaining the supporting water foils at the proper depth of submergence.

When depth control stabilization is attempted by manual controls and command signals, even at low speed, the complete attention of the operator is required at all times. At higher speeds, it is usually impossible to maintain the proper foil submergence depth by manual operation.

It is an object of my invention to maintain constant depth of foil submergence over a wide range of craft speeds without the constant attention of an operator. This object I achieve by providing an electrical circuit into which impedances may be connected, and a series of means disposed on a vertical member extending downward into the water, which means close different impedances into the circuit according to the depth of foil submergence. The variation in circuit impedance produces a signal which is used to control mechanical means for varying the lift of the hull supporting water foils.

My invention may be understood by reference to the following description and the accompanying drawings in which:

Fig. 5 is an enlarged side elevation of the forward starboard strut showing the electrical water contacts and the flap operating mechanism.

Fig. 8 is a perspective view of the aft port strut in detail.

Figure 2:
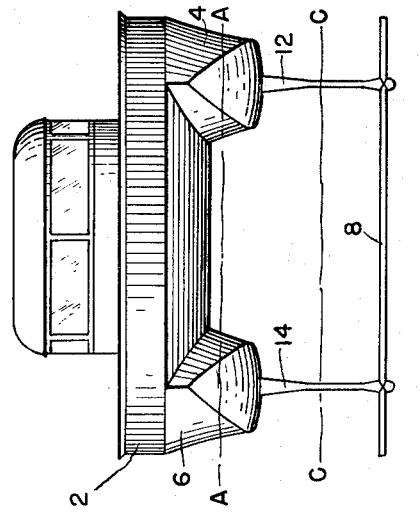
Fig. 2 is a front view of the craft.

The construction and mode of operation of my invention may conveniently be illustrated as applied to a hydrofoil craft (Figs. 1, 2 and 3) having superstructure 2 provided with catamaran hulls 4 and 6 to support the craft as a displacement vessel. With such a craft the water line might be disposed as indicated at A—A. This illustrative craft is provided with forward and aft foils 8 and 10, respectively, supported by downwardly extending struts 12, 14, 16 and 18. The foils 8 and 10 with their flaps 24, 26 and 32, 40 serve to raise the craft when critical speeds are attained and to support it dynamically. The flaps 24 and 26 may be rotated on foil 8 to vary the foil lift and thereby vary the depth of foil submergence. Similarly, the flaps 32 and 40 may be rotated to control the lift on foil 10.

My invention is adapted so to regulate the position of these flaps that in operation the foils are constantly maintained at a predetermined depth below the water surface. To accomplish this, I employ two identical electrical control systems, each of which operates independently and controls one of the two flaps 24, 26 on forward foil 8.

Figure 4:
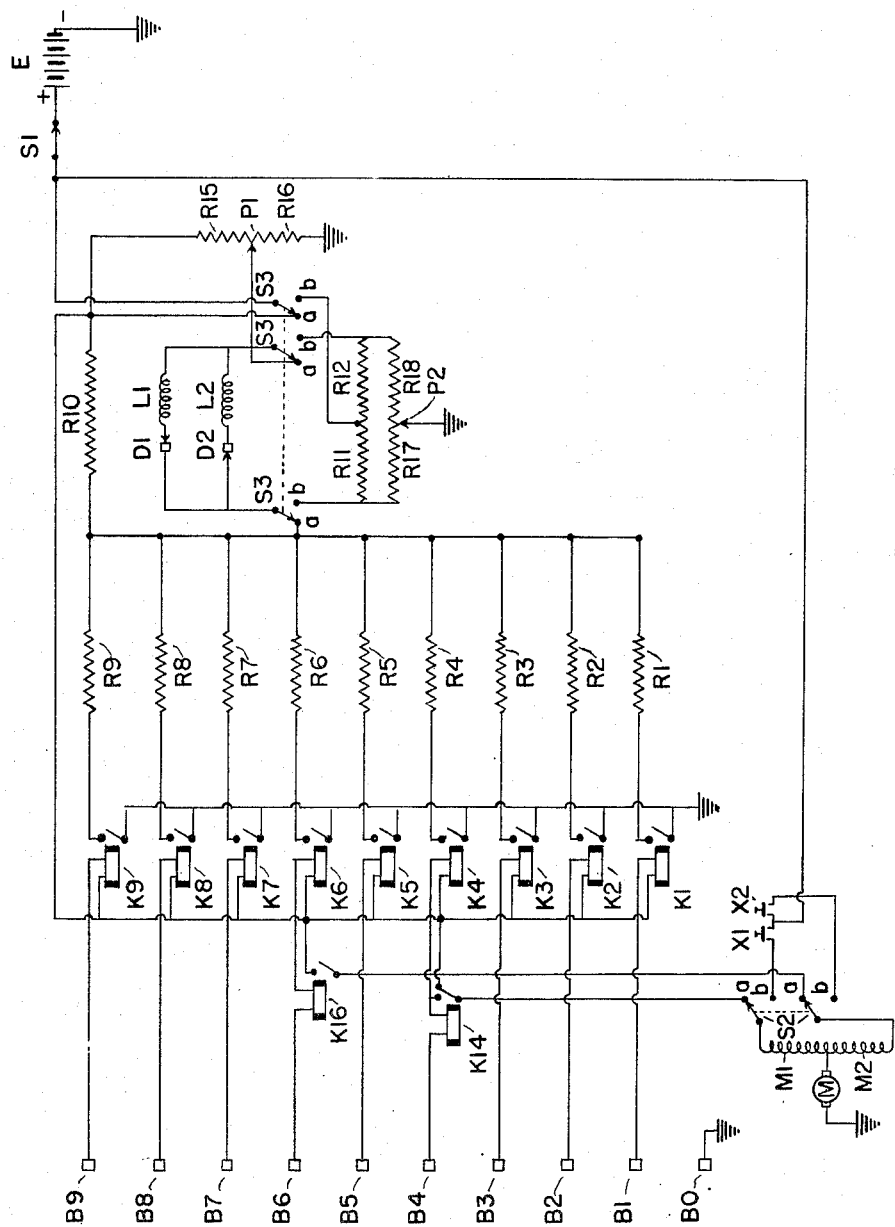
Fig. 4 is a schematic diagram of the electrical control circuit.

Considering, by way of example, the system which operates forward starboard flap 24, it will be seen from Fig. 4 that the automatic control circuit is basically a Wheatstone bridge type circuit, one arm of which consists of a group of resistors R1 to R9 which may be sequentially connected together in parallel to form a variable arm. The fixed resistor R10 is the second arm of the bridge, and the resistance segments R15, R16 on either side of the center tap of the potentiometer P1 form the other two arms of the bridge circuit. The bridge component of the Wheatstone bridge circuit consists of two parallel unidirectional current paths of opposite direction. In one path solenoid L1 and diode D1 are connected together in series; in the other path solenoid L2 and diode D2 are similarly connected. Thus, the polarity of the bridge unbalance determines which solenoid is energized and the extent of such energization. Power is applied to the bridge circuit in the conventional manner with the positive terminal of the battery E connected between common sides of R10 and P1, and the negative terminal of battery E, which is grounded, connected between P1 and the variable resistance arm. S1 is an on-off power switch through which all circuits are connected to the battery E.

Associated with each of the resistors R1 to R9 is a correspondingly numbered relay K which, when energized, connects its associated resistor into the variable arm of the bridge circuit. Each of these relays K is connected to battery E by means of a discontinuous circuit having one of its two open ends connected to ground, or a common circuit element, and the other connected to one of the water contacts B1–B9.

Water contacts B1–B9 (Figs. 4 and 5) are arranged in this preferred embodiment, at varying levels on the trailing edge of starboard strut 14. These contacts may, for example, be small copper areas separated by a dielectric material treated to prevent water adherence. Each water contact B, the relay K to which it is connected, and the resistor R which the relay connects into the variable arm of the bridge circuit, are all correspondingly numbered for clarity (Fig. 4). The lowest contact on strut 14, B0, is connected to ground, or to the common circuit element.

Figure 6:
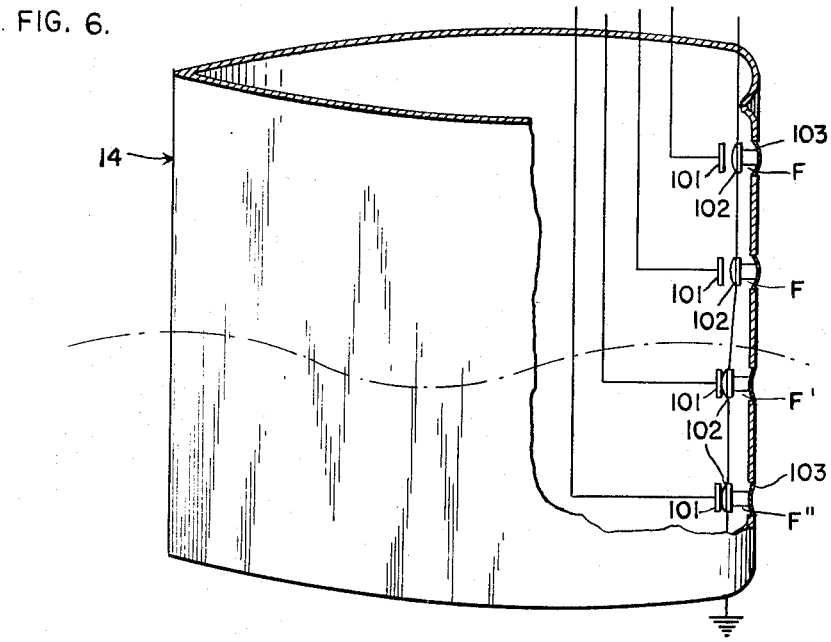
Figs. 6 and 7 show modifications of the surface sensing device which closes impedances into the control circuit.

In Fig. 6 there is shown a possible modification of the means for the surface sensing which energize relays K1 to K9 to connect resistances into the variable arm of the bridge circuit. The open ends of each discontinuous relay circuit are connected (Fig. 6) to the contacts 101, 102 of a pressure responsive switch F faired into the leading edge of strut 14 and located at the same elevation as the water contacts in the Fig. 5 embodiment. Contacts 102 are commonly grounded and attached to a slightly deformable strut surface segment 103 which, when submerged, is depressed by the water pressure against it closing each pair of contacts according to the depth of submergence (shown by F' and F").

Figure 7:
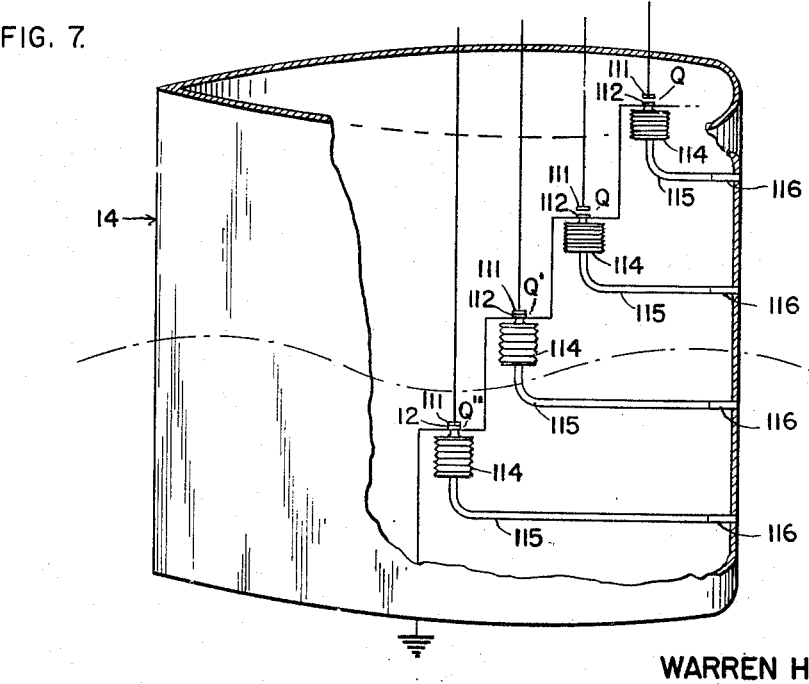

A further modification for the surface sensing system is shown in Fig. 7 in which the open ends of each discontinuous relay circuit are connected to the contacts 111, 112 of a pressure responsive switch Q which is closed by a bellows 114 connected by conduit 115 to a Pitot tube 116 in the leading edge of strut 14. Contacts 112 are commonly grounded and contacts 111 are connected to the control circuit in the same fashion as water contacts B in the Fig. 5 embodiment. A series of such Pitot tubes are located at varying elevations on the strut corresponding to the elevations of the water contacts described in connection with the Fig. 5 embodiment. The dynamic water pressure on the submerged Pitot tubes expands the bellows 114 and closes the contacts (as shown by Q' and Q").

Solenoids L1 and L2 (Fig. 4) referred to above, which are energized according to the magnitude and polarity of bridge unbalance, provide means for converting such intelligence to mechanical forces for varying the angle of flap 24 (Fig. 5).

Figure 9:
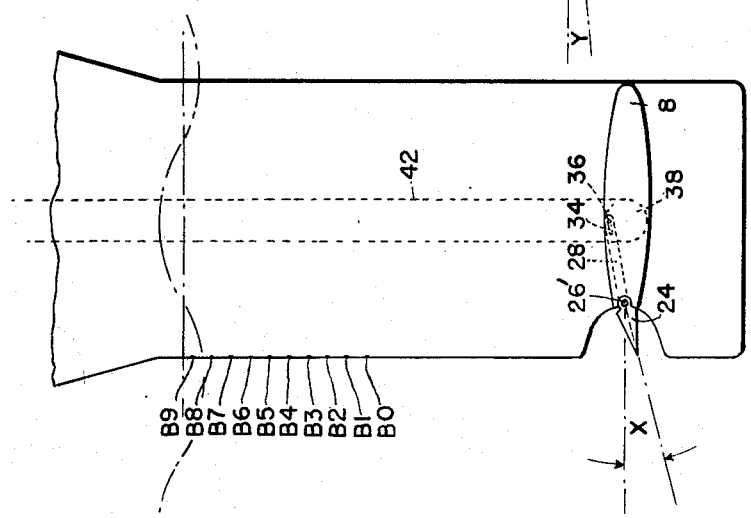

The flap controlling mechanism with which the illustrative craft is equipped, is shown in Figs. 5 and 9. The flap 24 is pivoted at 26' to the rearward portion of foil 8 and rigidly connected to one end of lever 28, the other end of which has an elongated slot 34 receiving a pin 36 by which the lever is attached to the wheel 38. Wheel 38 is rotated synchronously with wheel 44 by taut cable 42. Wheel 44 is rotated by the movement of piston rod 39 of hydraulic cylinder 45. Rod 39 is connected by pin 41 to the slotted extension 43 on wheel 44.

Pump 61 supplies fluid under pressure to the ends of hydraulic cylinder 45 via valves 62, 62a. The extent of opening of these valves is governed by the positions of the respective solenoids L1, L2 responding to the current flow in the bridge component of the circuit described above.

The position of the flap 24 is determined by the disposition of the piston rod 39 mechanically connected with the flap controlling lever 28 by the linkage 43, 44, 42 and 38 and operable as hereinafter described.

For manual control of flap 24, there is provided a separate bridge circuit (Fig. 4), the arms of which consist of fixed resistors R11 and R12, and the resistance segments R17, R18 on either side of the center tap of the potentiometer P2. A manual control lever disposed on bridge box 67 within control cabin 2 (Fig. 1) is adapted to position the center tap in the potentiometer P2.

Gang selector switch S3 also disposed within the control cabin serves to connect solenoids L1 and L2 and their associated diodes as the bridge component for either the automatic bridge circuit (position "a" of switch S3) or the manual bridge circuit (position "b" of switch S3), and also switches the power supply to the appropriate circuit.

In addition, I may provide for variation of the lift on rear foil 10 to maintain the craft trimmed at all times. This I accomplish by connecting in series in the K4 relay circuit (Fig. 4), a further relay K14 which is energized simultaneously with K4 when the latter's circuit is closed. Similarly, I provide in the K6 relay circuit a relay K16. Relay K14, when energized, opens a circuit which connects battery E to reversible motor M through its series field M1. Relay K16, when energized, closes a circuit from battery E to reversible motor M through its series field M2 opposite in polarity to M1. As shown in Fig. 8, motor M positions aft port flap 32 by means of worm gearing 53, wheel 52, taut cable 55, and a flap controlling mechanism of the type described for forward flap 24.

For manual trim control, I provide push buttons X1 and X2 (Fig. 4), disposed in the control cabin. These buttons operate the motor in one or the other direction depending upon which circuit is closed and which field M1 or M2 is thereby engaged. Selector switch S2, also located in the control cabin, serves to connect reversible motor M and its fields either for automatic operation by relays K14 and K16 (position "a" of switch S2) or for manual control by means of push buttons X1 and X2 (position "b" of switch S2).

A suggested arrangement for the physical location of the control circuit is shown in Fig. 5. Starboard bridge box 67 to which water contacts B on strut 14 are connected by leads 65 may contain the circuit components and the manual controls X1, X2, S1, S2, S3 and P2. Solenoids L1 and L2 may be located at the hydraulic valves 62, 62a which they operate. The center tap of follow-up potentiometer P1 is mechanically connected to move in accordance with the position of cable wheel 44.

The operation of the automatic control circuit of my invention may be described as follows:

It will be readily understood from the above description and the drawings referred to therein that, when the control circuit (Fig. 4) is connected for automatic operation by the closing of switch S1 and the moving of gang selector switch S3 to automatic position, as each water contact B1 to B9 is submerged, the water provides an electrical connection between it and B0, thus completing a circuit through battery E and through a correspondingly numbered relay which is consequently energized. Each such relay K1 to K9, when energized, connects in parallel a correspondingly numbered resistor R1 to R9 in the variable resistance arm of the bridge circuit, i. e., between ground and R10. The total resistance of this variable resistance arm is accordingly varied by the action of the relays in connecting or disconnecting these resistors in sequence.

The values of the resistors R1 through R5 and of the other components of the bridge circuit should be such that, when these resistors are connected in the variable arm, and the potentiometer P1 is centered, the bridge circuit is balanced and no current flows in the bridge component; further, that when, by a greater depth of strut submersion, any of the additional resistors R6 through R9 are connected in parallel in the variable arm, an unbalance is created which causes a current to flow through diode D1 and solenoid L1; and if the variable arm consists of less than R1 to R5 in parallel, an opposite unbalance is created which causes a current to flow through diode D2 and solenoid L2. The resistors R1 to R9 should also be of such values that the degree of unbalance and therefore the magnitude of the current through L1 or L2, varies directly with the number of resistors in the variable arm more or less than the five which cause bridge balance. Furthermore, the resistors are so matched that the unbalance created by adding in sequence a number of resistors to the bridge balancing R1 to R5 group, is equal though opposite to the unbalance created by removing in sequence the same number of resistors from the R1 to R5 group. In establishing the above standards for the resistance values, I have presupposed that the proper water level at cruising coincides with contact B5. Obviously, however, the entire circuit and arrangement could be based upon maintaining any other desired strut water level. The selection of proper resistance and other values to accomplish these results may readily be made by any person skilled in the electrical art.

It will be seen, therefore, that bridge unbalance varies concomitantly with the extent of departure of the water surface from the predetermined submergence level. The current flow in the bridge component of the circuit resulting from the unbalance energizes solenoid L1 or L2 (Fig. 5) to operate valves 62 or 62a respectively which valves, in turn, control the hydraulic pressure in opposite ends of the hydraulic cylinder 45. The position of forward flap 24 is determined by the setting of wheel 38 which setting is synchronized by cable 42 with the positioning of wheel 44 by the plunger arms 39 acting upon lever 43.

Solenoids L1 and L2 thus control the setting of forward flap 24. If the foil submergence is too great, the resulting unbalance energizes solenoid L1 which operates valve 62 to increase pressure in the upper end of hydraulic cylinder 45, thus forcing piston 31 downwardly and depressing the rod 39. This depression, via the linkage 43, 44, 42, 38 and 28, in sequence, causes flaps 24 to rotate downward, thereby increasing the lift on foil 8. Conversely, if foil submergence is too shallow, solenoid L2 is deenergized and valve 62 operated to decrease pressure in this upper end of the cylinder 45; and solenoid L2 is energized to operate valve 62a to increase pressure in the lower end of cylinder 45, thereby forcing plunger 39 upward, with similar ultimate effect upon flap 24. This upward movement of flap 24 decreases the lift on foil 8, or may even provide a negative lift.

As previously pointed out above, the center tap of follow-up potentiometer P1 is mechanically connected to wheel 44, the position of which is regulated by the position of plunger 39 in the hydraulic cylinder 45.

As the flap 24 is rotated in response to the bridge unbalance signal, the position of the center tap of the follow-up potentiometer P1 is moved in a direction which tends to restore balance in the bridge circuit, thereby gradually reducing the excitation to the solenoid L1 or L2 as the flap reaches its new position.

The trim mechanism is connected for automatic operation when power switch S1 is closed and selector switch S2 is set in the "a" position as shown in Fig. 4. When the water level at strut 14 is below water contact B4, neither relay K14 nor relay K16 is energized. Accordingly, battery E is connected to motor M and its series field M1, which rotates flap 32 toward its position of maximum lift. When the water level at strut 14 is above water contact B4, but below contact B6, relay K14 is energized while relay K16 is not. Consequently, the trim actuator motor does not operate. When both contact B4 and contact B6 are submerged, relays K14 and K16 are energized and motor M and its series field M2 are accordingly connected to battery E, thus rotating flap 32 toward its position of minimum lift. A separate and independent control system identical in construction and operation to that described above regulates forward port flap 26 and aft starboard flap 40, according to the signal received from the surface sensing means disposed on strut 12.

Since the trim circuit and the forward flap controlling circuit operate independently of each other, each may be controlled by separate surface sensing means. When these circuits are independently controlled it is an obvious modification of the above described preferred embodiments that the relay circuits may be omitted by connecting directly the terminals of the switches which the relays close to the contacts which, when closed, complete the relay circuits.

Figure 1:
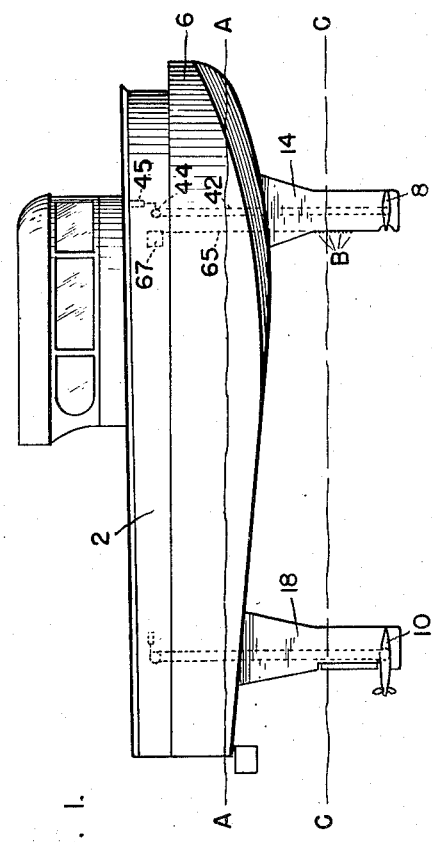
Fig. 1 is a side elevation of a craft equipped with my invention.

On starting, the craft runs with foils and struts completely submerged and with the hull supported by water displacement as indicated by the water line A—A (Fig. 1). Since all water contacts B on strut 14 are submerged, the automatic control circuit operates in the manner described above to depress flap 24. When flap 24 reaches its maximum deflection angle $x$ (Fig. 9), the follow-up potentiometer re-establishes bridge balance, thereby removing excitation from L1.

As the craft reaches a critical speed, it will rise on its foils, removing in sequence the upper strut water contacts from the water. As each contact leaves the water, the relay associated with it is de-energized, thus disconnecting the corresponding resistor from the variable arm of the bridge. Since the follow-up potentiometer had previously restored bridge balance after all resistors R1 through R9 were connected, the removal of R9 and each subsequent resistor from the bridge arm develops an unbalance which causes a decrease in the deflection of flap 24 until follow-up potentiometer P1 re-establishes bridge balance.

The craft continues to rise on its foils and to remove contacts from the water until the flap deflection creates a foil lift coefficient which is just adequate for the foil to support the craft at operating speeds. The hydrofoil means of the craft may be so designed that this condition is achieved when the flap 24 has a deflection angle $y$ (Fig. 10), which results from the submergence of strut contact buttons B1 through B5. The approximate water level in this condition is indicated by C—C (Figs. 1, 2).

Figure 10:
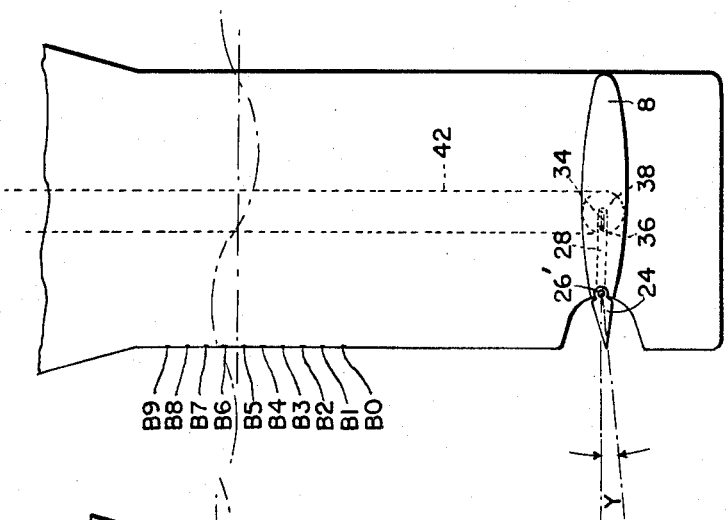
Figs. 9 and 10 are diagrammatic views illustrating the operation of my invention at the forward starboard strut.

If the craft continues to rise on its foils after the strut water level has reached contact B5, the consequent rotation of flap 24 will so reduce the lift coefficient of foil 8, that the latter cannot continue to support the craft. The craft will then return to the strut submergence which positions the flap at the proper deflection angle $y$ (Fig. 10).

With respect to the automatic trimming of the craft, it will be recalled that, from the discussion of the trim component of the control circuit, when contacts B4 and B6 in starboard strut 24 are submerged, flap 32 in the aft port strut is rotated to a position of minimum lift.

Thus, under normal conditions at cruising, if the forward starboard foil is too shallowly submerged, the rear port foil flap is rotated to increase the lift on the rear foil to secure the proper trim and, at the same time, to change the orientation of the forward foil to provide less lift thereon. Conversely, if the forward foil is too deeply submerged, the rear foil flap is rotated to decrease the lift on the rear foil for proper trim and to cause the forward foil lift to be increased.

Figure 3:
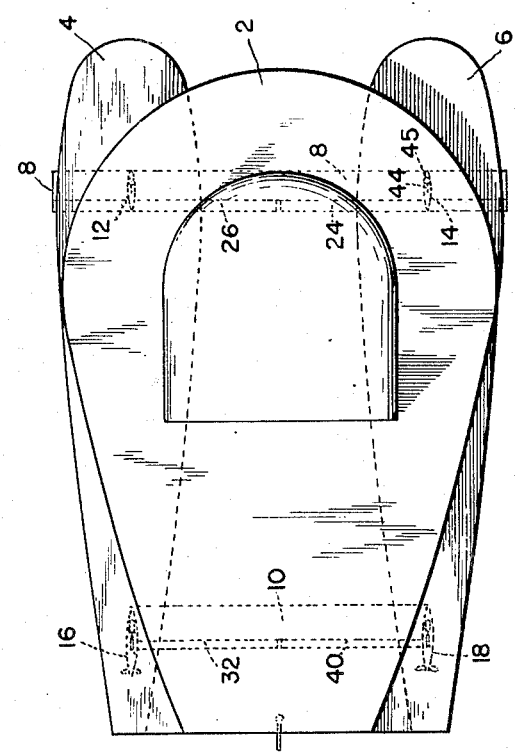
Fig. 3 is a plan view of the craft.

While I have described my invention in connection with a craft of the type shown in Figs. 1, 2 and 3, and in this connection, I have provided for trim control of diagonally opposite rear foil flaps, my invention may also be applied to this or other types of craft, e. g., a single hull craft, and trimming may be dispensed with altogether.

Furthermore, the depth stabilization mechanism which I have described as applied to the forward foil of the illustrative craft may similarly be employed individually to all supporting foils.

While the invention has been disclosed herein in connection with particular embodiments and specific structural details, it is clear that numerous changes, modifications and equivalents could be made or used by those skilled in the art without departing from the spirit of the invention and the scope of the appended claims.

I claim:
1. In a craft having a displacement hull adapted to be supported by a variable lift hydrofoil mounted on a strut extending at least partially vertically below the hull, mechanism for controlling the foil lift, said mechanism comprising an electrical circuit including a circuit element responsive to and emitting a varying signal according to the magnitude of current flow therein, a series of impedances adapted to be introduced cumulatively into said circuit to vary the magnitude of current flow in said circuit element, a series of contacts separated from each other, a series of relays each of which when energized connects one of said impedances into said circuit, a series of relay circuits connecting each of said relays to a voltage source, said relay circuits being discontinuous at open ends connected to said contacts, means disposed at different levels in the strut for closing said contacts according to the depth of submersion of the strut, thereby energizing said relays and introducing the impedances associated therewith into said electrical circuit according to the depth of submersion of the strut, means for converting the varying signal from the said current responsive circuit element into mechanical energy, and means to utilize said variation in mechanical energy to modify lift of the hydrofoil.

2. In a craft having a displacement hull adapted to be supported by a variable lift hydrofoil mounted on a strut extending at least partially vertically below the hull, mechanism for controlling the foil lift, said mechanism comprising a Wheatstone bridge type electrical circuit including an additive arm and a series of different resistances adapted to be introduced cumulatively into said arm, a bridge component in which the current flow varies in magnitude and direction in response to the resistances introduced in said additive arm, said bridge component emitting a varying electrical signal according to the variation in current flow therein and a mechanically variable resistance element in at least one arm of said circuit; a series of contacts separated from each other, a series of relays each of which when energized connects one of said resistances into said additive arm, a series of relay circuits connecting each of said relays to a voltage source, said relay circuits being discontinuous at open ends connected to said contacts, means disposed at different levels in the strut for closing said contacts according to the depth of submersion of the strut, means for converting the varying electrical signal into mechanical energy, and mechanical means for modifying the lift of the hydrofoil, said mechanical means being adapted to utilize the magnitude and direction of the said mechanical energy to predetermined extents, and said mechanical means being connected to said variable resistance element to vary the resistance thereof to decrease the current flow in said bridge component as the foil lift is varied in response to the electrical signal from said bridge component.

3. In a craft having a displacement hull adapted to be supported by a variable lift hydrofoil mounted on a strut extending at least partially vertically below the hull, mechanism for controlling the foil lift, said mechanism comprising a Wheatstone bridge type electrical circuit including an additive arm and a series of different resistances adapted to be introduced cumulatively into said arm, a bridge component in which the current flow varies in magnitude and direction in response to the resistances introduced in said additive arm, said bridge component emitting a varying electrical signal according to the variation in current flow therein, a series of contacts separated from each other, a series of relays each of which when energized connects one of said resistances into said additive arm, a series of relay circuits connecting each of said relays to a voltage source, said relay circuits being discontinuous at open ends connected to said contacts, means disposed at different levels in the strut for closing said contacts according to the depth of submersion of the strut, means for converting the varying electrical signal into mechanical energy, and mechanical means for modifying the lift of the hydrofoil, said mechanical means being adapted to utilize the magnitude and direction of the said mechanical energy to predetermined extents.

4. The mechanism as described in claim 1 wherein the contacts extend through the skin of the strut to the outside surface thereof, whereby the contacts which are immersed in water according to the submergence of the strut are electrically connected together by the water medium thereby causing their respective relays to be energized.

5. The mechanism as described in claim 4 wherein one of said contacts is common to each of said discontinuous relay circuits and is disposed as the lowest contact on the strut so that with the submersion of the strut, each contact above the lowest is electrically connected to the lowest contact by the water medium thereby completing its respective discontinuous relay circuit.

6. The mechanism as described in claim 1 wherein one of said contacts is common to each of said discontinuous relay circuits, and the means for closing said contacts comprises a series of bellows, a series of Pitot tubes disposed at different levels in the strut and connected by conduits to said bellows, each of said bellows being expandable in response to water pressures occasioned by the submergence of its respective Pitot tube, each said bellows having a movable end, a series of electrically conductive elements located on said movable bellows ends, the last said element being electrically connected together and to the contact common to each of said relay circuits, and the others of said contacts being disposed opposite and slightly separated from said electrically conductive elements, whereby each of the said elements is closed with its respective contact by the expansion of its respective bellows when the Pitot tube communicating therewith is submerged.

7. The mechanism as described in claim 1 wherein one of said contacts is common to each of said discontinuous relay circuits, and the means for closing said contacts comprises a series of flexible membranes disposed at different levels in the skin of the strut, one side of each of said membranes being in direct contact with the water when the strut is submerged, and the other side of each of said membranes having an electrically conductive element, all of the last said elements being interconnected and further connected to said contact common to each of said relay circuits, and each of the others of said contacts being disposed opposite and slightly separated from one electrically conductive element, so that when the strut is submerged in the water, the water pressure against each of the submerged membranes forces the one of said elements against its respective opposite contact, thereby closing the same.

8. In a craft having a displacement hull, adapted to be supported by variable lift hydrofoils in tandem mounted on struts extending at least partially vertically below the hull, said craft in plan view being divided for reference into quarters by the fore-aft center line and by an amidship line extending abeam, the combination of water surface detecting means adapted to emit a varying signal according to the distance from a point in the hull to the water surface, said means disposed beneath one of said quarters of the craft, variable lift hydrofoil element mounted beneath a second quarter diagonally opposite the first said quarter, mechanism for varying the lift of said hydrofoil element, said mechanism adapted to operate in response to the signals from the said water surface detecting means to maintain the craft level with the water surface, both in pitch and roll.

9. In a craft having a displacement hull adapted to be supported by a variable lift hydrofoil mounted on a strut extending at least partially vertically below the hull, a mechanism for controlling the foil list, said mechanism comprising a series of contacts separated from each other, an electrical circuit including, and responsive to, a series of different impedances, said impedances being adapted to be introduced cumulatively into said circuit, and each of said impedances being connected to one of said contacts and to a common element of the circuit, the others of said contacts being connected to a second common element of said circuit, said contacts being adapted to be closed together to interpose said impedances into said circuit, means disposed at different levels in the strut for closing said contacts, according to the depth of submersion of the strut, thereby introducing the impedance connected with each said contact into said circuit, said circuit being adapted to emit a varying signal depending upon the number of impedances thus introduced therein, means for converting said variation in signal to a variation in mechanical energy, and means to utilize said variation in mechanical energy to modify lift of the hydrofoil.

References Cited in the file of this patent
UNITED STATES PATENTS

| Number | Name | Date |
|---|---|---|
| 2,387,907 | Hook | Oct. 30, 1945 |
| 2,576,717 | Gardiner | Nov. 27, 1951 |